United States Patent
Smith et al.

(10) Patent No.: US 10,326,590 B2
(45) Date of Patent: Jun. 18, 2019

(54) TECHNOLOGIES FOR TRUSTED DEVICE ON-BOARDING

(71) Applicant: Intel Corporation, Santa Clara, CA (US)

(72) Inventors: Ned M. Smith, Beaverton, OR (US); Jesse Walker, Hillsboro, OR (US); Mats Agerstam, Portland, OR (US); Ravi S. Subramaniam, San Jose, CA (US); Eduardo Cabre, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 164 days.

(21) Appl. No.: 14/670,874

(22) Filed: Mar. 27, 2015

(65) Prior Publication Data
US 2016/0134419 A1 May 12, 2016

Related U.S. Application Data

(60) Provisional application No. 62/078,077, filed on Nov. 11, 2014.

(51) Int. Cl.
*H04L 9/08* (2006.01)
*H04L 9/30* (2006.01)
(Continued)

(52) U.S. Cl.
CPC .......... *H04L 9/0841* (2013.01); *H04L 9/0833* (2013.01); *H04L 9/0844* (2013.01);
(Continued)

(58) Field of Classification Search
CPC ....... H04L 9/0838; H04L 9/0841; H04L 9/14; H04L 9/30
See application file for complete search history.

(56) References Cited

U.S. PATENT DOCUMENTS

| 6,507,907 B1 * | 1/2003 | Takahashi | H04N 7/163 348/E7.061 |
| 2001/0002486 A1 * | 5/2001 | Kocher | G06F 7/723 713/171 |

(Continued)

FOREIGN PATENT DOCUMENTS

EP 2518932 A2 10/2012

OTHER PUBLICATIONS

Matisse—Semester 2 Review: Unit 5—Exponent Rules, May 23, 2011, Blogspot.*

(Continued)

*Primary Examiner* — John B King
*Assistant Examiner* — Arya Golriz
(74) *Attorney, Agent, or Firm* — Barnes & Thornburg LLP (57) ABSTRACT

Technologies for trusted device on-boarding include a first computing device to generate a first public Diffie-Hellman key based on a private Diffie-Hellman key and a first unique identifier of the first computing device. The first unique identifier is retrieved from secure memory of the first computing device. The first computing device transmits the first public Diffie-Hellman key to a second computing device and receives, from the second computing device, a second public Diffie-Hellman key of the second computing device. The second public Diffie-Hellman key incorporates a second unique identifier of the second computing device. Further, the first computing device removes a contribution of the second unique identifier from the second public Diffie-Hellman key to generate a modified public Diffie-Hellman key and generates a shared Diffie-Hellman key based on the modified public Diffie-Hellman key and the private Diffie-Hellman key of the first computing device.

22 Claims, 6 Drawing Sheets

(51) Int. Cl.
*H04L 9/14* (2006.01)
*H04W 12/04* (2009.01)

(52) U.S. Cl.
CPC .............. *H04L 9/0866* (2013.01); *H04L 9/14* (2013.01); *H04L 9/30* (2013.01); *H04L 9/3013* (2013.01); *H04W 12/04* (2013.01); *H04L 2209/127* (2013.01)

(56) References Cited

U.S. PATENT DOCUMENTS

| | | | | |
|---|---|---|---|---|
| 2002/0042884 A1* | 4/2002 | Wu | .................. | G06F 21/645 |
| | | | | 726/10 |
| 2006/0064510 A1* | 3/2006 | Low | .................. | H04L 49/90 |
| | | | | 710/5 |
| 2006/0093138 A1 | 5/2006 | Durand | | |
| 2006/0143453 A1 | 6/2006 | Imamoto | | |
| 2006/0195405 A1* | 8/2006 | Miura | .................. | G06F 21/10 |
| | | | | 705/65 |
| 2006/0215837 A1 | 9/2006 | Chen | | |
| 2007/0283151 A1* | 12/2007 | Nakano | ............... | H04L 63/0442 |
| | | | | 713/168 |
| 2008/0195867 A1* | 8/2008 | Asokan | ............... | H04L 63/0861 |
| | | | | 713/176 |
| 2008/0263363 A1* | 10/2008 | Jueneman | ............... | G06F 21/32 |
| | | | | 713/184 |
| 2010/0002721 A1* | 1/2010 | Eller | .................. | H04L 67/14 |
| | | | | 370/466 |
| 2010/0042838 A1* | 2/2010 | Ho | .................. | H04L 9/0844 |
| | | | | 713/169 |
| 2010/0205443 A1 | 8/2010 | Zhao | | |
| 2011/0213977 A1* | 9/2011 | Little | .................. | H04L 9/0844 |
| | | | | 713/171 |
| 2012/0290830 A1* | 11/2012 | Resch | .................. | H04L 9/0841 |
| | | | | 713/150 |
| 2013/0091362 A1 | 4/2013 | Poeluev | | |
| 2013/0111209 A1* | 5/2013 | Harkins | .................. | H04L 9/321 |
| | | | | 713/171 |
| 2014/0082358 A1 | 3/2014 | Nakhjiri et al. | | |
| 2014/0108805 A1 | 4/2014 | Smith et al. | | |
| 2014/0180816 A1* | 6/2014 | Mith | .................. | G06Q 30/0251 |
| | | | | 705/14.55 |

OTHER PUBLICATIONS

International Search Report for PCT/US15/054153, dated Jan. 22, 2016 (3 pages).
Written Opinion for PCT/US15/054153, dated Jan. 22, 2016 (4 pages).
Mario Cagalj, 'Key Agreement in Peer-to-Peer Wireless Networks', Proceedings of the IEEE, vol. 94, No. 2, Feb. 2006 pp. 467-478.
Extended European Search Report, EP patent application No. 15858445.8, dated May 29, 2018 (9 pages).
Brickell et al., "Enhanced Privacy ID from Bilinear Pairing for Hardware Authentication and Attestation," Social Computing (SocialCom), 2010 IEEE Second International Conference on, IEEE, Piscataway, NJ, USA, Aug. 20, 2010, pp. 768-775, XP031767912.

* cited by examiner

TECHNOLOGIES FOR TRUSTED DEVICE ON-BOARDING

CROSS-REFERENCE TO RELATED U.S. PATENT APPLICATION

The present application claims priority under 35 U.S.C. § 119(e) to U.S. Provisional Patent Application Ser. No. 62/078,077, entitled "TRUSTWORTHY DEVICE ON-BOARDING MECHANISM," which was filed on Nov. 11, 2014.

BACKGROUND

The Internet of Things (IoT) involves including electronics and software (e.g., communication software) in devices that are generally not considered computerized in nature or otherwise not considered capable of electronic control (e.g., standard embedded systems). Those devices are often referred to as cyber-physical (CP) devices/systems. Such cyber-physical systems typically present a significant challenge to network security, because those systems oftentimes lack meaningful security mechanisms. For example, cyber-physical systems typically lack the hardware underpinnings necessary for trustworthy key storage, boot, and execution within the components (e.g., systems-on-a-chip (SoCs)) and controllers that comprise the cyber-physical systems. Additionally, some IoT network stacks utilize non-optimized code for fragmentation and others do not have fragmentation support at all.

Various mechanisms have been employed to provide a higher level of network security for cyber-physical systems. For example, one approach involves establishing a network enclave such that low-security cyber-physical devices are "hidden" behind a gateway or router capable of higher security. In such systems, the cyber-physical gateway may be trusted to prevent the spread of malware that may originate from within the network enclave due to a lack of security of the cyber-physical devices. However, cyber-physical devices are increasingly connected to multiple networks simultaneously, which often makes the use of a cyber-physical gateway infeasible.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
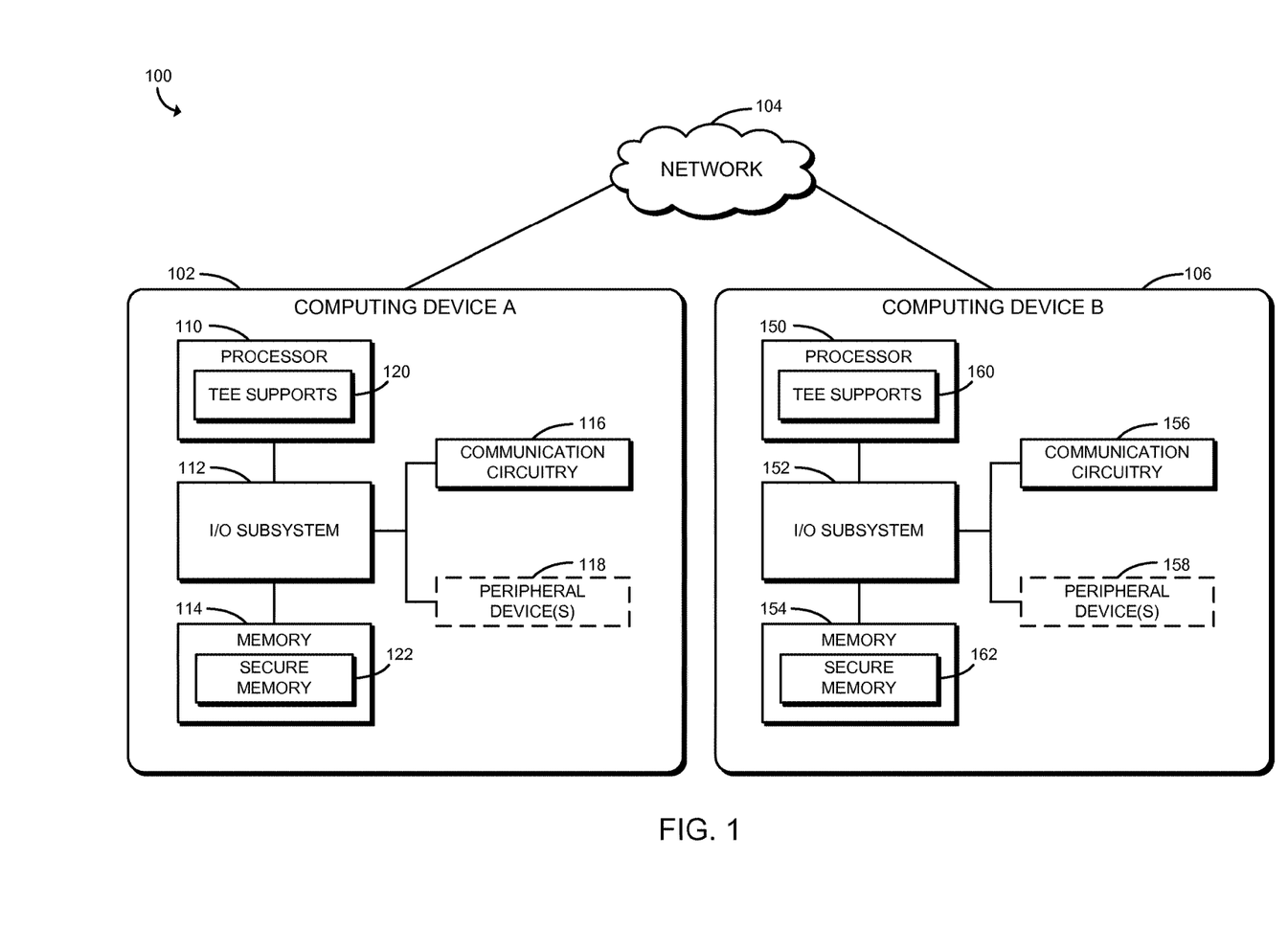
FIG. 1 is a simplified block diagram of at least one embodiment of a system for trusted device on-boarding.

Referring now to FIG. 1, a system 100 for trusted device on-boarding includes a computing device 102 (i.e., a computing device A), a network 104, and a computing device 106 (i.e., a computing device B). Although only one computing device 102, one network 104, and one computing device 106 are illustratively shown in FIG. 1, the system 100 may include any number of computing devices 102, networks 104, and/or computing devices 106 in other embodiments.

As described in detail below, the system 100 permits peer-to-peer discovery and execution of an over-the-air "take ownership" protocol. In particular, the computing device 102 may register itself and discover the computing device 106. Upon discovery, the computing device 102 may open a communication connection with the computing device 106 and perform a secure key exchange with that computing device 106. As described below, the illustrative secure key exchange involves the exchange of six messages between the computing devices 102, 106. It should be appreciated that the illustrative secure key exchange algorithm addresses fragmentation by including attestation and unique identifier authentication (e.g., personal identification number (PIN) or password authentication) as part of the secure key exchange/agreement itself. Accordingly, in some embodiments, the techniques described herein work even with computing devices 102, 106 having no fragmentation support. Because the illustrative protocol is bilateral, the networks 104 can occur dynamically based on the techniques described herein.

The computing device 102 is embodied as a cyber-physical device or other IoT device in the illustrative embodiment. However, in other embodiments, the computing device 102 may be embodied as any type of computing device capable of performing the functions described herein. For example, the computing device 102 may be embodied as a smart device, desktop computer, server, router, switch, laptop computer, tablet computer, notebook, netbook, Ultrabook™, cellular phone, smartphone, wearable computing device, personal digital assistant, mobile Internet device, Hybrid device, and/or any other computing/communication device. As shown in FIG. 1, the illustrative computing device 102 includes a processor 110, an input/output ("I/O") subsystem 112, a memory 114, and a communication circuitry 116. In some embodiments, the computing device 102 may also include one or more peripheral devices 118. Additionally, as described herein, one or more of the components of the computing device 102 may form a portion of or be executed within a trusted execution environment 210 (see FIG. 2) of the computing device 102. Of course, the computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

Figure 2:
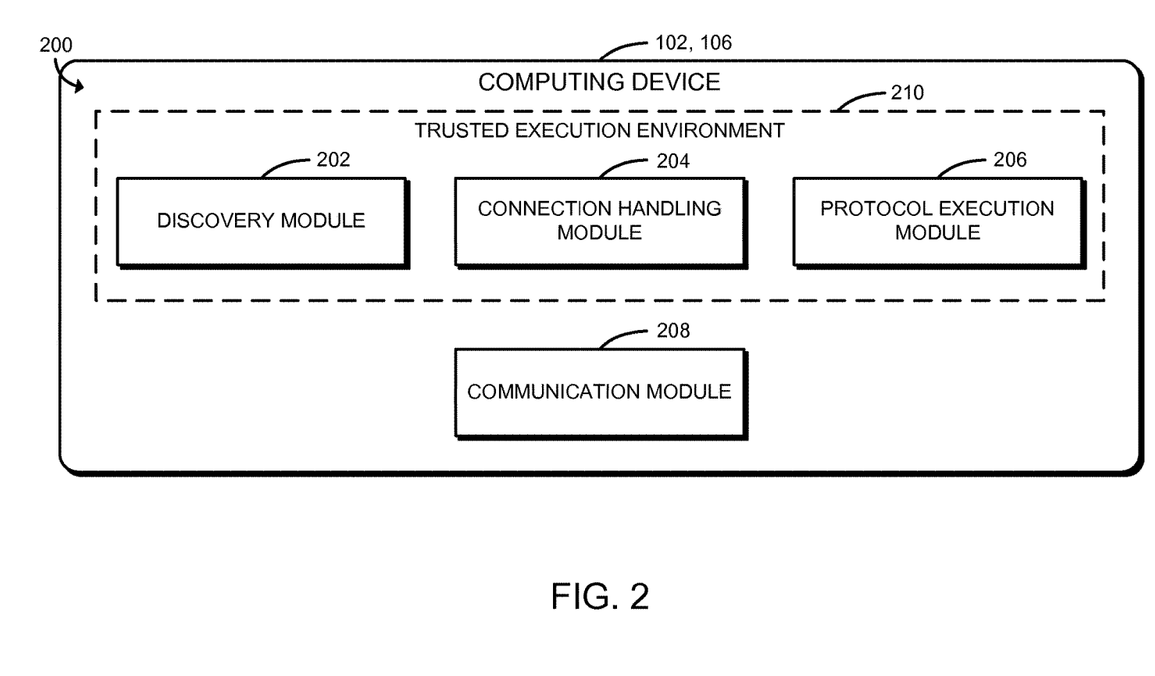
FIG. 2 is a simplified block diagram of at least one embodiment of an environment of a computing device of the system of FIG. 1.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. As shown, in the illustrative embodiment, the processor 110 includes one or more trusted execution environment (TEE) supports 120, which may be utilized by the computing device 102 in establishing the trusted execution environment 210. It should be appreciated that, in some embodiments, the TEE supports 120 provide hardware-reinforced security for the trusted execution environment 210. Although the TEE supports 120 are illustratively shown in the processor 110, in some embodiments, one or more of the other components of the computing device 102 may include TEE supports 120. Further, in some embodiments, the computing device 102 may include a security engine or security co-processor configured to utilize the TEE supports 120 and/or establish the trusted execution environment 210.

As shown, in the illustrative embodiment, the memory 114 includes a portion of secure memory 122. In some embodiments, the secure memory 122 may be embodied as a secure partition of the memory 114, whereas in other embodiments, the secure memory 122 may be embodied or included on a separate hardware component. As described herein, the secure memory 122 may store various data provisioned to the computing device 102. For example, the secure memory 122 may store a private direct anonymous attestation (DAA) key of the computing device 102 provisioned by a manufacturer of the chipset and/or the trusted execution environment 210. As described below, the DAA key may be associated with any one-to-many cryptographic algorithm suitable for performing the functions described herein. For example, in some embodiments, the DAA key may be embodied as an Enhanced Privacy Identification (EPID) key. In some embodiments, the DAA private key is "burned" into the secure memory 122 and the DAA group public key is transmitted to the purchaser of the computing device 102 by virtue of a certificate authority or website. The secure memory 122 may also store a password, PIN, or other unique identifier of the computing device 102 provisioned there, for example, by an original equipment manufacturer (OEM) of the computing device 102. Of course, the secure memory 122 may store various other data depending on the particular embodiment (e.g., DAA group names, device identifiers, whitelists, expected PIN values, etc.). In some embodiments, the provisioned data is stored in read-only memory of the secure memory 122. In the illustrative embodiment, the secure memory 122 is not trivially modifiable subsequent to provisioning of the data to the secure memory 122.

The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 102, on a single integrated circuit chip.

The communication circuitry 116 may be embodied as any communication circuit, device, or collection thereof, capable of enabling communications between the computing device 102 and other remote devices over the network 104 (e.g., the computing device 106). The communication circuitry 116 may be configured to use any one or more communication technologies (e.g., wireless or wired communications) and associated protocols (e.g., Ethernet, Bluetooth®, Wi-Fi®, WiMAX, etc.) to effect such communication.

The peripheral devices 118 may include any number of additional peripheral or interface devices, such as speakers, microphones, additional storage devices, and so forth. The particular devices included in the peripheral devices 118 may depend on, for example, the type and/or intended use of the computing device 102.

The network 104 may be embodied as any type of communication network capable of facilitating communication between the computing devices 102, 106. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof.

The computing device 106 may be embodied as any computing device capable of performing the functions described herein. As indicated above, in the illustrative embodiment, the computing device 102 is embodied as a cyber-physical device or other IoT device. However, in other embodiments, the computing device 106 may be embodied as a smart device, cellular phone, smartphone, wearable computing device, personal digital assistant, mobile Internet device, laptop computer, tablet computer, notebook, netbook, Ultrabook™, desktop computer, server, router, switch, Hybrid device, and/or any other computing/communication device.

As shown in FIG. 1, the illustrative computing device 106 includes a processor 150, an input/output ("I/O") subsystem 152, a memory 154, and a communication circuitry 156. Additionally, in some embodiments, the computing device 106 includes one or more peripheral devices 158, the processor 150 includes TEE supports 160, and/or the memory 154 includes a secure memory 162. Further, in some embodiments, one or more of the components of the computing device 106 may form a portion of or otherwise be executed within a trusted execution environment. Of course, the computing device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. In some embodiments, the components of the computing device 106 are similar to the corresponding components of the computing device 102 described above. As such, the description of those components is not repeated herein for clarity of the description.

Referring now to FIG. 2, in use, each of the computing devices 102, 106 establishes an environment 200 for trusted device on-boarding. The illustrative environment 200 of the computing device 102 includes a discovery module 202, a connection handling module 204, a protocol execution module 206, and a communication module 208. The various modules of the environment 200 may be embodied as hardware, software, firmware, or a combination thereof. For example, the various modules, logic, and other components of the environment 200 may form a portion of, or otherwise be established by, the processor 110 or other hardware components of the computing device 102. As such, in some embodiments, one or more of the modules of the environment 200 may be embodied as a circuit or collection of electrical devices (e.g., a discovery circuit, a connection handling circuit, a protocol execution circuit, and/or a communication circuit). Additionally, in some embodiments, one or more of the illustrative modules may form a portion of another module and/or one or more of the illustrative modules may be embodied as a standalone or independent module. Further, in some embodiments, one or more of the modules of the environment 200 may be established within a trusted execution environment 210.

The discovery module 202 is configured to handle the registration and broadcasting of the existence of the computing device 102, 106. Additionally, the discovery module 202 attempts to discover other computing devices 102, 106 (e.g., nearby computing devices) that can, for example, take ownership of the computing device 102, 106. For example, in some embodiments, the discovery module 202 permits a computing device 102, 106 that is newly connected to a user's local network to broadcast itself such that a previously connected computing device 102, 106 can take ownership of the new computing device 102, 106. It should be appreciated that the discovery module 202 may utilize any suitable algorithms, techniques, and/or mechanisms for performing the functions described herein.

The connection handling module 204 handles the communication connections between the computing device 102, 106 and remote computing devices. For example, in the illustrative embodiment, the connection handling module 204 may open a communication connection with another discovered computing device 102, 106 and subsequently close that communication connection (e.g., upon performing a secure key exchange and establishing ownership).

The protocol execution module 206 is configured to perform various functions for the execution of the protocol (s) described herein. In particular, in the illustrative embodiment, the protocol execution module 206 executes the functions required to perform the secure key exchange described herein. As such, the protocol execution module 206 is configured to perform various operations associated with the execution of a Diffie-Hellman key exchange and/or related operations (e.g., prime number selection, primitive root selection, modular arithmetic, etc.). Further, the protocol execution module 206 may perform various security-related functions (e.g., attestation and cryptography). For example, the protocol execution module 206 may generate hashes (e.g., keyed hashes, MACs, truncated HMACs, and/or other pseudorandom functions), perform cryptographic signatures (e.g., DAA-based signatures), and/or perform other security-related functions.

The communication module 208 handles the communication between the computing device 102, 106 and remote devices (e.g., other computing devices 102, 106) through the network 104. For example, as described herein, the communication module 208 transmits and receives the messages associated with device discovery, connection management (opening/closing connections), and the secure key exchange as described herein.

The trusted execution environment 210 may be embodied as any component(s) or circuitry capable of establishing a secure and trusted execution environment for the computing device 102 and otherwise performing the functions described herein. In some embodiments, the trusted execution environment 210 may be "hardened" (e.g., via the TEE supports 120) using Intel® secure enclaves (SGX), Intel® Converged Security Engine (CSE), and/or any other suitable technique/technology.

Figure 3:
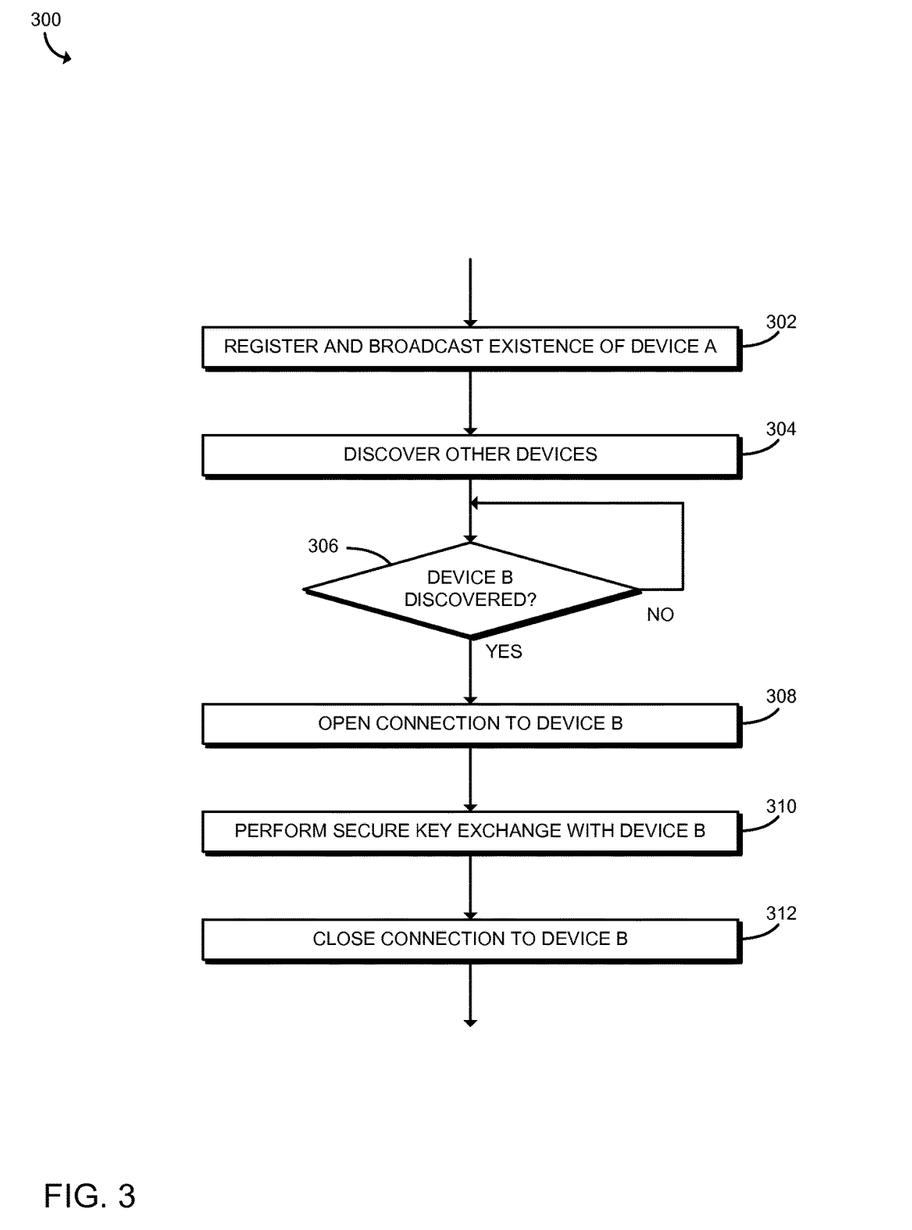
FIG. 3 is a simplified flow diagram of at least one embodiment of a method for trusted device on-boarding that may be executed by the computing device of FIG. 2.

Referring now to FIG. 3, in use, the computing device 102 may execute a method 300 for trusted device on-boarding. It should be appreciated that the method 300 is described herein in regard to communication between the computing device 102 (i.e., device A) and the computing device 106 (i.e., device B). The illustrative method 300 begins with block 302 in which the computing device 102 registers and broadcasts the existence of the computing device 102 to other computing devices (e.g., computing devices in the vicinity or within the same network as the computing device 102). It should be appreciated that the computing device 102 may register and/or broadcast its existence using any suitable algorithms, techniques, and/or mechanisms.

In block 304, the computing device 102 attempts to discover other computing devices (e.g., nearby computing devices) that can, for example, take ownership of the computing device 102. In block 306, the computing device 102 determines whether another computing device 106 has been discovered. If so, the computing device 102 opens a communication connection with the discovered computing device 106 in block 308.

In block 310, the computing device 102 performs a secure key exchange with the computing device 106. To do so, the computing device 102 may execute a method 400 as described below in reference to FIGS. 4-5. Of course, in other embodiments, the computing device 102 may perform the secure key exchange using any suitable technique. As described herein, in some embodiments, the secure key exchange protocol may be configured to utilize a small maximum transmission unit (MTU) size and limited computational abilities of a cyber-physical device. In some embodiments, the secure key exchange protocol is a bilateral over-the-air (OTA) take-owner protocol that involves exchanging and verifying unique device identifiers between two computing devices 102, 106, exchanging and verifying group (DAA group) affiliations of the computing devices 102, 106, and performing attestation of the environments of the computing devices 102, 106. Further, in some embodiments, the secure key exchange establishes the ownership of each of the computing devices 102, 106. In block 312, the computing device 102 may close the connection to the computing device 106. Further, the computing device 102 may utilize the keys (e.g., symmetric keys) generated during the secure key exchange for various other functions (e.g., to provision other services/credentials, open a different session, etc.).

Figure 4:
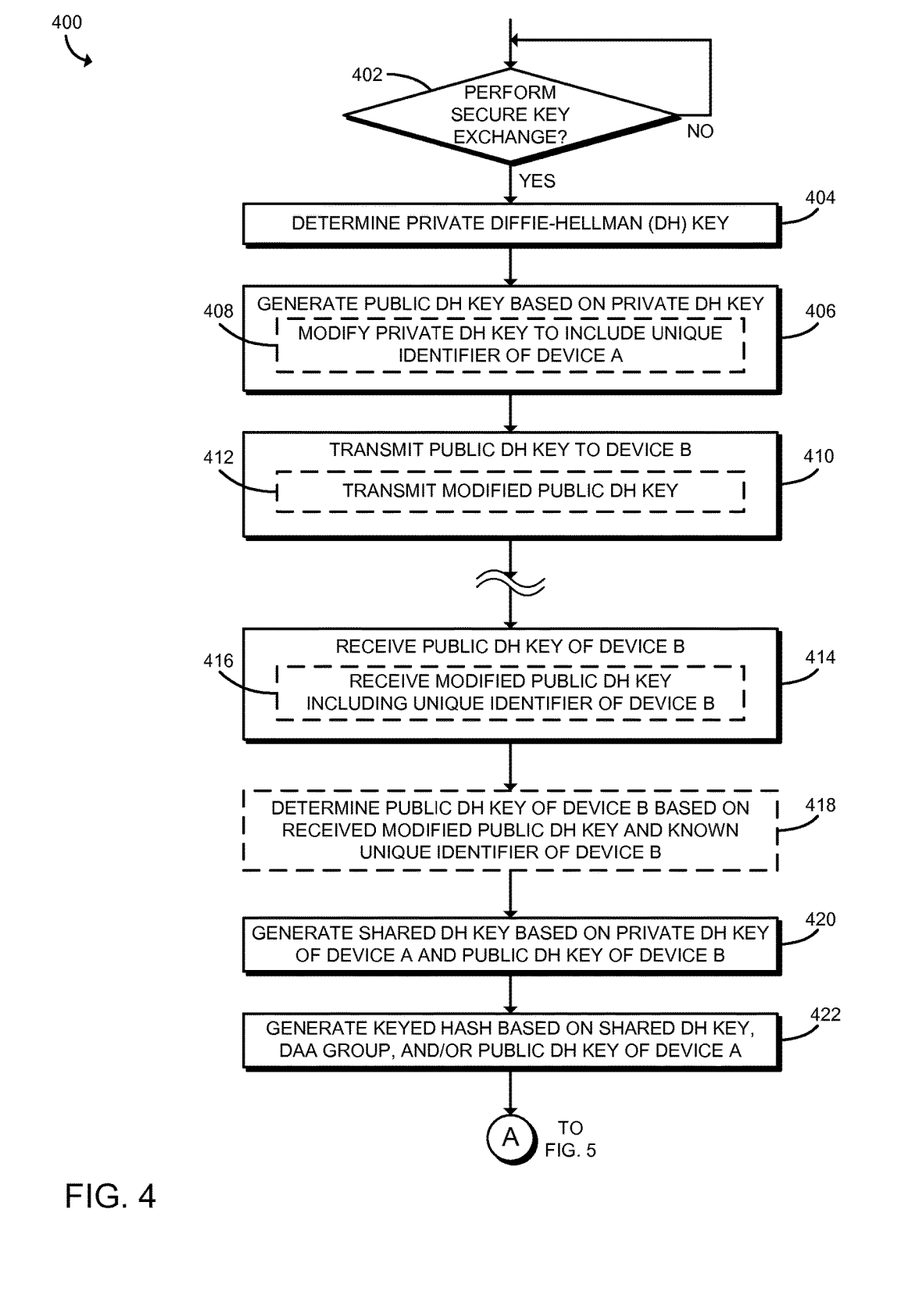
FIGS. 4-5 is a simplified flow diagram of at least one embodiment of a method for performing a secure key exchange that may be executed by the computing device of FIG. 2.
Figure 5:
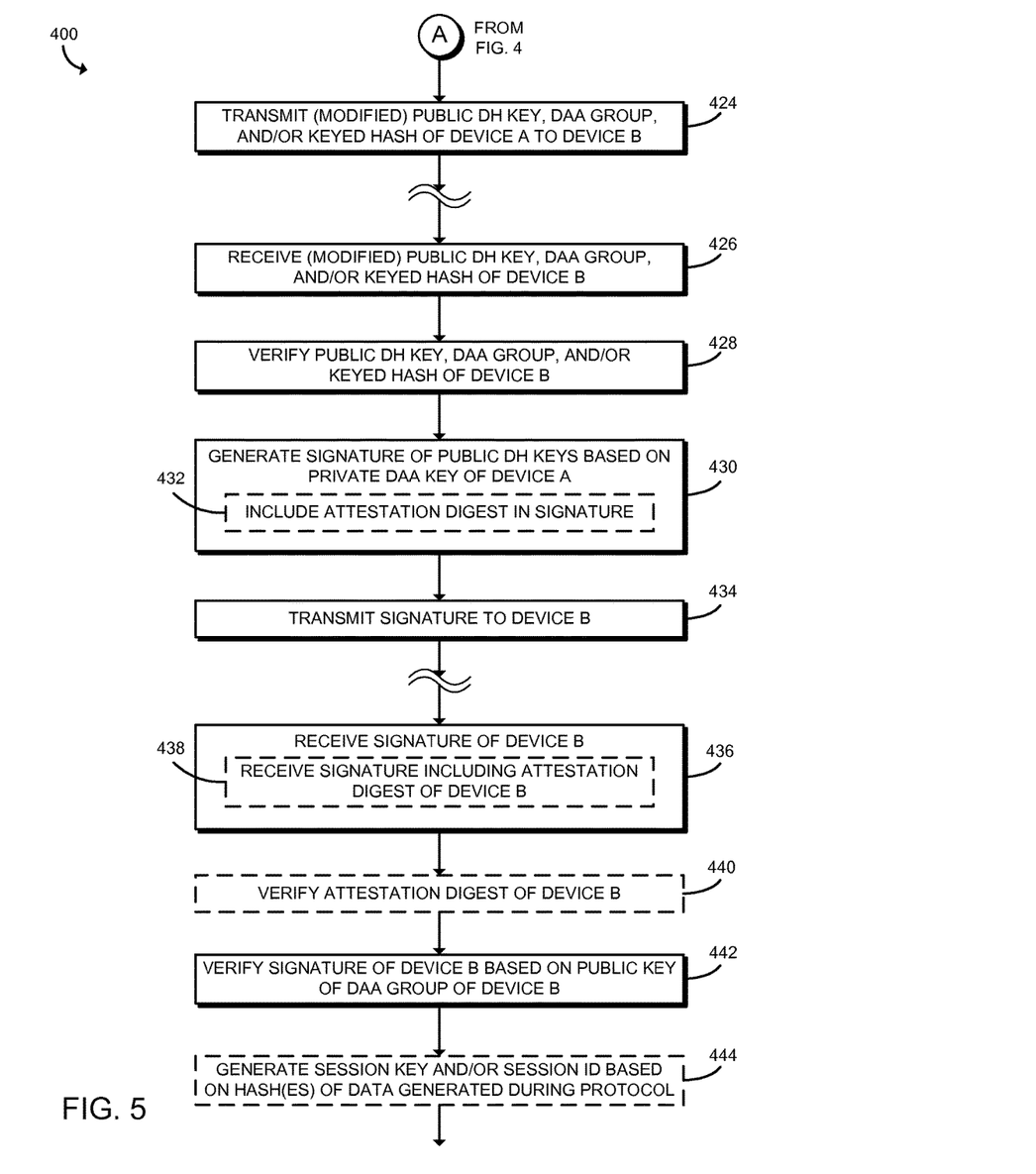

Referring now to FIGS. 4-5, in use, the computing device 102 may execute a method 400 for performing a secure key exchange with the computing device 106. In the illustrative embodiment, by the completion of the secure key exchange protocol (assuming the protocol does not abort), the computing devices 102, 106 will have agreed on the instance of the protocol, the parties participated in the instance of the protocol, and the group(s) to which the parties belong. Further, in some embodiments, the computing devices 102, 106 may derive one or more session keys and a session identifier that uniquely identifies the protocol instance with high probability. In some embodiments, the secure key exchange may be incorporated into existing infrastructures such as, for example, Datagram Transport Layer Security (DTLS) and/or Extensible Authentication Protocol (EAP).

The illustrative method 400 begins with block 402 of FIG. 4 in which the computing device 102 determines whether to perform the secure key exchange. If so, the computing device 102 determines a private Diffie-Hellman (DH) key, a, of the computing device 102 in block 404. It should be appreciated that the DH keys and/or other calculations described herein may be performed under a selected prime modulus (i.e., via modular arithmetic). Further, in selecting the private DH key, a, the computing device 102 may select a random integer or n-bit sequence (mod the selected prime).

In block 406, the computing device 102 generates a public DH key, $g^a$, for the computing device 102 based on the private DH key, a. In doing so, it should be appreciated that the primitive root, g, is a generator for an abelian group under the selected prime modulus and utilized by both of the computing devices 102, 106 during the secure key exchange protocol. The computing devices 102, 106 may utilize any suitable technique to agree upon the particular primitive root and prime used for the algorithm.

In block 408, the computing device 102 may modify the private DH key to include unique identifier such as, for example, a PIN, password, serial number, or other unique identifier. As indicated above, the unique identifier may be provisioned into the secure memory 122 of the computing device 102, for example, during manufacture of the computing device 102 (e.g., by an OEM). In the illustrative embodiment, the unique identifier is unique to the particular device to which it is provisioned and may be separately distributed (e.g., to the purchasing customer) via an out-of-band communication channel. In some embodiments, the unique identifier is inscribed on product packaging and/or the computing device 102 itself for verification of ownership. Depending on the particular embodiment, the unique identifier may be retrieved from the secure memory 122 (e.g., by the trusted execution environment 210 of the computing device 102) or entered (e.g., via a user interface) by a user of the computing device 102. In the illustrative embodiment, the computing device 102 modifies the public DH key, $g^a$, by incorporating the unique identifier, $p_1$, into the public DH key (see, for example, sub-flow 602 of FIG. 6). In particular, the computing device 102 generates the modified public DH key as $g^{a+p_1}$ (e.g., according to $g^{a+p_1}=g^a g^{p_1}$ or by first calculating $a+p_1$). It should be appreciated that, in some embodiments, $p_1$ is the unique identifier itself, whereas in other embodiments $p_1$ is a hash (e.g., a cryptographic hash) of the unique identifier, which is also unique.

In block 410, the computing device 102 transmits the public DH key to the computing device 106. In particular, in block 412, the computing device 102 may transmit the modified public DH key, $g^{a+p_1}$ (see, for example, sub-flow 604 of FIG. 6). In other embodiments, the computing device 102 may transmit the unmodified public DH key, $g^a$ (e.g., if the unique identifier is not utilized and/or it is otherwise utilized). In some embodiments, the users of the computing devices 102, 106, for example, participating in a dynamic network formation may communicate unique identifiers (e.g., PINs, public DH keys, etc.) out-of-band using a suitable technique, algorithm, and/or mechanism. For example, in some embodiments, the unique identifier may be communicated out-of-band by virtue of a vibration haptic actuator and an accelerometer to receive the unique identifier (e.g., encoded as vibration patterns). In another embodiment, the unique identifier may be communicated through a low volume ultrasonic speaker and received with a microphone suitable for sensing the outputted audio. In yet another embodiment, a secure printed medium including a QR printed code contained in device packaging or a display capability in the new device may be utilized to communicate the unique identifier(s). In some embodiments, a body area network may be established and a touch capacitance interface on the new device and user device may be utilized to communicate the unique identifier(s). In yet another embodiment, the computing devices 102, 106 may include near field communication (NFC) circuitry such as, for example, an NFC antenna and NFC reader, which may be used to communicate the unique identifier(s) out-of-band.

As indicated by the "double tilde" symbol of FIG. 4, the computing device 102 may wait, for example, while the computing device 106 performs various operations associated with the secure key exchange protocol. For example, as depicted by sub-flow 606 of FIG. 6, depending on the particular embodiment, the computing device 106 may verify that the public DH key, $g^a$, or the modified public DH key, $g^{a+p_1}$, is indeed a member of the abelian group generated by g (e.g., to ensure that an error or malicious attack has not occurred). Further, the computing device 106 may perform similar operations to those performed by the computing device 102 and described in blocks 404-412 of FIG. 4. In particular, the computing device 106 may select a private DH key, b, for the computing device 106 and generate a public DH key, $g^b$, and/or modified public DH key, $g^{b+p_2}$ (i.e., based on a unique identifier, $p_2$, of the computing device 106). Depending on the particular embodiment, the computing device 106 may transmit the public DK key, $g^b$, or the modified public DH key, $g^{b+p_2}$, to the computing device 102.

In block 414, the computing device 102 receives the public DH key of the computing device 106. As indicated above, in block 416, the computing device 106 may receive the modified public DH key, $g^{b+p_2}$, of the computing device 106 (see, for example, sub-flow 608 of FIG. 6). In other embodiments, the computing device 102 receives the unmodified public DH key, $g^b$, of the computing device 106. Further, in some embodiments, the computing device 102 verifies that the public DH key or modified public DH key is a member of the abelian group generated by g as described above. Additionally, in some embodiments, the computing device 102 may confirm that the public DH key of the computing device 106 is not equal to that of the computing device 102 (i.e., $g^a \neq g^b$) and/or that the modified public key of the computing device 106 is not equal to that of the computing device 102 (i.e., $g^{a+p_1} \neq g^{b+p_2}$).

In block 418, the computing device 102 may determine the public DH key, $g^b$, of the computing device 106 based on the modified public DH key, $g^{b+p_2}$, of the computing device 106 and a known value of the unique identifier, $p_2$, of the computing device 106. As indicated above, the known value of the unique identifier may be retrieved over an out-of-band communication channel in some embodiments. However, it should be appreciated that the known value of the unique identifier may be retrieved and/or determined using any other suitable technique in other embodiments. Based on the retrieved known value of the unique identifier, the computing device 102 may calculate the public DH key, $g^b$, according to $g^b = g^{b+p_2}/g^{p_2}$. In block 420, the computing device 102 generates a shared DH key based on the private DH key, a, of the computing device 102 and the public DH key, $g^b$, of the computing device 106. In particular, in the illustrative embodiment, the computing device 102 generates the shared DH key, $g^{ab}$, according to $g^{ab}=(g^b)^a$.

Figure 6:
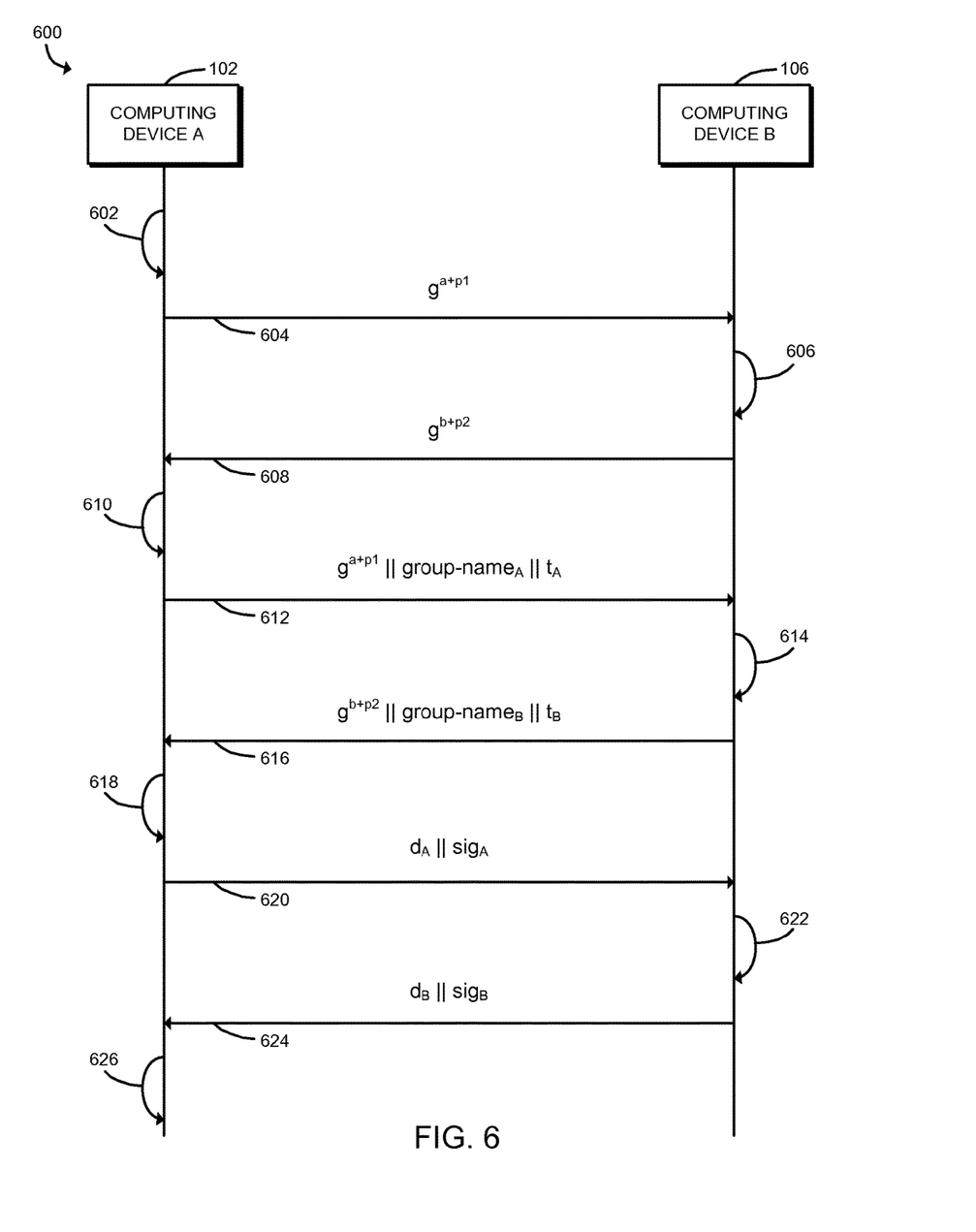
FIG. 6 is a simplified data flow diagram of at least one embodiment of the method of FIGS. 4-5.

In block 422, the computing device 102 generates a keyed hash based on the shared DH key, the DAA group of the computing device 102, and/or the public DH key of the computing device 102 (see, for example, sub-flow 610 of FIG. 6). It should be appreciated that the keyed hash may be generated according to any suitable hash algorithm. In the illustrative embodiment, the computing device 102 generates the keyed hash on the data, x, based on a pseudorandom function, prf(k,x), using the key, k. For example, in some embodiments, the pseudorandom function may be implemented as a truncated HMAC (e.g., HMAC-SHA256) or an AES-CMAC algorithm. In particular, the keyed hash, $t_A$, may be generated according to $t_A$=prf(ak, $g^a\|group_A$) in which $group_A$ is an identifier of a DAA group to which the computing device 102 belongs (e.g., an EPID group of the computing device 102), ak=prf(dk,1), and dk=prf(0,$g^{ab}$) or dk=prf($p_1$,$g^{ab}$). In embodiments in which the unique identifier is incorporated in the public DH keys, it should be appreciated that the computing device 102 may generate the keyed hash according to $t_A$=prf(ak, $g^{a+p_1}\|group_A$).

In some embodiments, the computing device 102 deletes the private DH key, a, and/or the shared DH key, $g^{ab}$, in response to generating the keyed hash (e.g., to provide forward secrecy). It should be appreciated that the keyed hash may serve to prove that the computing device 102 is indeed the initiator of the protocol and/or bind the protocol instance to the affiliation defined by the DAA group of the computing device 102.

In block 424 of FIG. 5, the computing device 102 transmits the public DH key (or modified public DH key), DAA group identifier, and/or the keyed hash of the computing device 102 to the computing device 106 (see, for example, sub-flow 612 of FIG. 6). For example, depending on the particular embodiment, the computing device 102 may transmit the message $g^a\|group_A\|t_A$ or $g^{a+p_1}\|group_A\|t_A$ to the computing device 106.

As indicated by the "double tilde" symbol following block 424 of FIG. 5, the computing device 102 may wait, for example, while the computing device 106 performs various operations associated with the secure key exchange protocol. For example, as depicted by sub-flow 614 of FIG. 6, the computing device 106 may verify the received public DH key, the DAA group, and/or the keyed hash. In particular, the computing device 106 may confirm that the public DH key, $g^a$ or $g^{a+p_1}$, of the computing device 102 matches that received in a previous communication. Further, the computing device 106 may verify that $group_A$ identifies a DAA group having a known or accessible public DAA key (e.g., verify that it is a valid EPID group). Additionally, the computing device 106 may re-compute the keyed hash to confirm the integrity of the transmitted data. Additionally, the computing device 106 may perform similar operations to those performed by the computing device 102 and described in blocks 420-424 of FIGS. 4-5. In particular, the computing device 106 may generate the shared DH key, $g^{ab}$, according to $g^{ab}=(g^a)^b$. Further, the computing device may generate a keyed hash, $t_B$, according to $t_B$=prf(ak,$g^b\|group_B$) or $t_B$=prf(ak,$g^{b+p_2}\|group_B$), depending on the particular embodiment, in which $group_B$ is an identifier of the DAA group to which the computing device 102 belongs as described above. Additionally, depending on the particular embodiment, the computing device 106 may transmit the message $g^b\|group_B\|t_B$ or $g^{b+p_2}\|group_B\|t_B$ to the computing device 102 (see, for example, sub-flow 616 of FIG. 6).

In block 426, the computing device 102 receives the public DH key (or modified public DH key), DAA group identifier, and/or the keyed hash of the computing device 106. In block 428, the computing device 102 verifies the received public DH key (or modified public DH key), the DAA group identifier, and/or the keyed hash of the computing device 106. In doing so, the computing device 102 may confirm that the public DH key, $g^b$ or $g^{b+p_2}$, of the computing device 106 matches that received in a previous communication. Further, the computing device 102 may verify that $group_B$ identifies a DAA group having a known or accessible public DAA key. It should be appreciated that, in some embodiments, the DAA group of the computing device 102 may be different from the DAA group of the computing device 106. Additionally, the computing device 102 may re-compute the keyed hash to confirm the integrity of the transmitted data.

In block 430, the computing device 102 generates a cryptographic signature of the public DH keys of the computing devices 102, 106 based on the private DAA key of the computing device 102. It should be appreciated that the signature may be generating using any suitable cryptographic algorithm and that the computing device 102 may generate signatures, sign$_A$(y,DAAgroup), over data, y, based on the private DAA key of the computing device 102 associated with its particular DAA group (e.g., a private EPID key). In particular, the computing device 102 may generate a signature, sig$_A$, according to sig$_A$=sign$_A$(g$^a$||g$^b$||v, group$_A$) in which v=prf(dk,2). In some embodiments, in block 432, the computing device 102 may include an attestation digest in the generated signature. For example, as depicted by sub-flow 618 of FIG. 6, the computing device 102 may generate the signature according to sig$_A$=sign$_A$ (g$^a$||g$^b$||v||d$_A$,group$_A$) in which d$_A$ is the attestation digest of the computing device 102. It should be appreciated that the attestation digest may be generated by the trusted execution environment 210 of the computing device 102 based on, for example, a measurement of various components and/or functions of the computing device 102 (e.g., during the boot process). As such, the attestation digest may serve as integrity data for the computing device 102, which may be compared by another computing device to expected attestation data for the computing device 102 (e.g., via published digest values). More specifically, the attestation digest may be computed as a hash of the software, firmware, and/or setting values of the loaded or currently executing code/data of the computing device 102. In some embodiments, the attestation digest for each of the computing devices belonging to a particular DAA group is the same. In block 434, the computing device 102 transmits the generated signature and/or the attestation digest to the computing device 106 (see, for example, sub-flow 620 of FIG. 6).

As indicated by the "double tilde" symbol following block 434 of FIG. 5, the computing device 102 may wait, for example, while the computing device 106 performs various operations associated with the secure key exchange protocol. For example, as depicted by sub-flow 622 of FIG. 6, the computing device 106 may verify the signature using the verification key for the DAA group of the computing device 102 (e.g., the corresponding public DAA key or, more particularly, the corresponding public EPID key). Additionally, the computing device 106 may retrieve the expected digest values for the computing device 102 and compare the expected digest to the attestation digest received from the computing device 102. If there is a match, the computing device 106 may infer that the components/functions of the computing device 102 have not been tampered with. Additionally, the computing device 106 may perform similar operations to those performed by the computing device and described in block 430-434 of FIG. 6. In particular, the computing device 106 may generate a signature, sig$_B$, and/or attestation digest, d$_B$, and transmit them to the computing device 102 (see, for example, sub-flow 624 of FIG. 6). For example, in some embodiments, the computing device 106 generates the signature, sig$_B$, according to sig$_B$=sign$_B$ (g$^a$||g$^b$||v,group$_B$) or sig$_B$=sign$_B$(g$^a$||g$^b$||v||d$_B$,group$_B$) depending on whether the attestation digest is included. As such, in block 436, the computing device 102 receives the signature of the computing device 106. In particular, in block 438, the computing device 102 may receive a signature including an attestation digest of the computing device 106 as described above.

In block 440, the computing device 102 may verify the attestation digest, d$_B$, of the computing device 106. In some embodiments, the computing device 102 retrieves the expected digest values for the computing device 106 based on, for example, the DAA group of the computing device 106 and compares the expected digest to the attestation digest received from the computing device 106. If there is a match, the computing device 102 may infer that the components/functions of the computing device 106 have not been tampered with as described above. In block 442, the computing device 102 verifies the signature of the computing device 106 using the verification key for the DAA group of the computing device 106 (see, for example, sub-flow 626 of FIG. 6). For example, in embodiments in which the computing devices 102, 106 belong to one or more EPID groups, private EPID keys of the computing devices 102, 106 may be utilized to perform signatures such that the corresponding public EPID keys may be used to verify the signatures.

In block 444, the computing device 102 and/or the computing device 106 may generate a session key and/or a session identifier based on hashes of data generated during the execution of the secure key exchange protocol. For example, a session key may be generated based on the shared DH key and/or a session identifier may be generated based on the public DH keys and the DAA group identifiers. In particular, in some embodiments, the session key, sk, may be generated according to sk=prf(ak,3) and the session identifier, sid, may be generated according to sid=hash (g$^a$||g$^b$||group$_A$||group$_B$) based on a suitable hash algorithm (e.g., a cryptographic hash algorithm). In some embodiments, ak and dk may be deleted in response to generating the session key (e.g., to provide forward secrecy).

It should be appreciated that, in some embodiments, the DAA-based signatures used in the method 400 may be replaced with conventional signatures. In such embodiments, the keyed hash of the computing device 102 (e.g., t$_A$=prf(ak,g$^a$||group$_A$)) may be replaced with t$_A$=prf(ak, g$^a$||id$_A$) in which id$_A$ is a unique identifier of the computing device 102, and the other keyed hashes may be similarly replaced. Further, the signatures described herein may be performed based on a conventional signature key rather than a DAA key.

EXAMPLES

Illustrative examples of the technologies disclosed herein are provided below. An embodiment of the technologies may include any one or more, and any combination of, the examples described below.

Example 1 includes a first computing device for trusted device on-boarding, the first computing device comprising a protocol execution module to generate a first public Diffie-Hellman key based on a private Diffie-Hellman key and a first unique identifier of the first computing device, wherein the first unique identifier is retrieved from secure memory of the first computing device; and a communication module to (i) transmit the first public Diffie-Hellman key to a second computing device and (ii) receive, from the second computing device, a second public Diffie-Hellman key of the second computing device, wherein the second public Diffie-Hellman key incorporates a second unique identifier of the second computing device, wherein the protocol execution module is further to (i) remove a contribution of the second unique identifier from the second public Diffie-Hellman key to generate a modified public Diffie-Hellman key and (ii) generate a shared Diffie-Hellman key based on the modified public Diffie-Hellman key and the private Diffie-Hellman key of the first computing device.

Example 2 includes the subject matter of Example 1, and wherein to remove the contribution of the second unique identifier comprises to generate the modified public Diffie-Hellman key according to g$^b$=g$^{b+p}$/g$^p$, wherein g$^b$ is the modified public Diffie-Hellman key; $g^{b+p}$ is the second public Diffie-Hellman key; and p is the second unique identifier.

Example 3 includes the subject matter of any of Examples 1 and 2, and wherein the protocol execution module is further to retrieve a known identifier for the second computing device over an out-of-band communication channel; and wherein the known identifier is the second unique identifier.

Example 4 includes the subject matter of any of Examples 1-3, and wherein to generate the shared Diffie-Hellman key comprises to generate the shared Diffie-Hellman key according to $g^{ab}=(g^b)^a$, wherein a is the private Diffie-Hellman key of the first computing device.

Example 5 includes the subject matter of any of Examples 1-4, and wherein the protocol execution module is further to generate a first keyed hash based on the shared Diffie-Hellman key, a first direct anonymous attestation group identifier of the first computing device, and the first public Diffie-Hellman key; and wherein the communication module is further to transmit the first public Diffie-Hellman key, the first direct anonymous attestation group identifier, and the first keyed hash to the second computing device.

Example 6 includes the subject matter of any of Examples 1-5, and wherein the first direct anonymous attestation group identifier comprises an Enhanced Privacy Identification (EPID) group name.

Example 7 includes the subject matter of any of Examples 1-6, and wherein the communication module is further to receive a second direct anonymous attestation group identifier and a second keyed hash from the second computing device; and wherein the protocol execution module is further to verify the second direct anonymous attestation group identifier and the second keyed hash.

Example 8 includes the subject matter of any of Examples 1-7, and wherein the second direct anonymous attestation group identifier comprises an Enhanced Privacy Identification (EPID) group name.

Example 9 includes the subject matter of any of Examples 1-8, and wherein to verify the second direct anonymous attestation group identifier comprises to verify that the second direct anonymous attestation group identifier identifies a direct anonymous attestation group having a known public key.

Example 10 includes the subject matter of any of Examples 1-9, and wherein the protocol execution module is further to generate a first signature of the first public Diffie-Hellman key and the second public Diffie-Hellman key based on a private direct anonymous attestation key of the first computing device; and wherein the communication module is further to transmit the first signature to the second computing device.

Example 11 includes the subject matter of any of Examples 1-10, and wherein the first signature comprises a first signature of the first public Diffie-Hellman key, the second public Diffie-Hellman key, and a first attestation digest of the first computing device based on the private direct anonymous attestation key of the first computing device.

Example 12 includes the subject matter of any of Examples 1-11, and wherein the communication module is further to receive, from the second computing device, a second signature of the second computing device; and wherein the communication module is further to verify the second signature based on a public key corresponding with the second direct anonymous attestation group identifier.

Example 13 includes the subject matter of any of Examples 1-12, and wherein the public key comprises a public Enhanced Privacy Identification (EPID) key that corresponds with an EPID group of the second computing device.

Example 14 includes the subject matter of any of Examples 1-13, and wherein the second signature comprises a second signature of the first public Diffie-Hellman key, the second Diffie-Hellman key, and a second attestation digest of the second computing device.

Example 15 includes the subject matter of any of Examples 1-14, and wherein to verify the second signature comprises to verify that the second attestation digest corresponds with an attestation digest expected of a computing device having the second direct anonymous attestation group identifier.

Example 16 includes the subject matter of any of Examples 1-15, and wherein the protocol execution module is further to generate a session key based on the shared Diffie-Hellman key; and generate a session identifier based on the first public Diffie-Hellman key, the second public Diffie-Hellman key, the first direct anonymous attestation group identifier, and the second direct anonymous attestation group identifier.

Example 17 includes the subject matter of any of Examples 1-16, and further including a discovery module to (i) broadcast an existence of the first computing device to nearby computing devices and (ii) discover the second computing device; and a connection handling module to open a communication connection to the second computing device, wherein to generate the first public Diffie-Hellman key comprises to generate the first public Diffie-Hellman key in response to opening the communication connection.

Example 18 includes the subject matter of any of Examples 1-17, and wherein to transmit the first public Diffie-Hellman key comprises to transmit the first public Diffie-Hellman key to the second computing device over an out-of-band communication channel.

Example 19 includes the subject matter of any of Examples 1-18, and further including a vibration haptic actuator, wherein to transmit the first public Diffie-Hellman key comprises to transmit the first public Diffie-Hellman key via the vibration haptic actuator, and wherein the transmission of the first public Diffie-Hellman key is to be received by an accelerometer of the second computing device.

Example 20 includes the subject matter of any of Examples 1-19, and further including a low volume ultrasonic speaker, wherein to transmit the first public Diffie-Hellman key comprises to transmit the first public Diffie-Hellman key using the low volume ultrasonic speaker, and wherein the transmission of the first public Diffie-Hellman key is to be received by a speaker of the second computing device.

Example 21 includes the subject matter of any of Examples 1-20, and wherein to transmit the first public Diffie-Hellman key comprises to transmit the first public Diffie-Hellman key based on a secure printed medium including a Quick Response (QR) code indicative of the first unique identifier.

Example 22 includes the subject matter of any of Examples 1-21, and wherein to transmit the first public Diffie-Hellman key comprises to transmit the first public Diffie-Hellman key over a body area network and using a touch capacitance interface of the first computing device.

Example 23 includes the subject matter of any of Examples 1-22, and further including near field communication circuitry, wherein to transmit the first public Diffie- Hellman key comprises to transmit, by the near field communication circuitry, the first public Diffie-Hellman key over a near field communication channel established between the first computing device and the second computing device.

Example 24 includes a method for trusted device onboarding, the method comprising generating, by a first computing device, a first public Diffie-Hellman key based on a private Diffie-Hellman key and a first unique identifier of the first computing device, wherein the first unique identifier is retrieved from secure memory of the first computing device; transmitting, by the first computing device, the first public Diffie-Hellman key to a second computing device; receiving, by the first computing device and from the second computing device, a second public Diffie-Hellman key of the second computing device, wherein the second public Diffie-Hellman key incorporates a second unique identifier of the second computing device; removing, by the first computing device, a contribution of the second unique identifier from the second public Diffie-Hellman key to generate a modified public Diffie-Hellman key; and generating, by the first computing device, a shared Diffie-Hellman key based on the modified public Diffie-Hellman key and the private Diffie-Hellman key of the first computing device.

Example 25 includes the subject matter of Example 24, and wherein removing the contribution of the second unique identifier comprises generating the modified public Diffie-Hellman key according to $g^b = g^{b+p}/g^p$, wherein $g^b$ is the modified public Diffie-Hellman key; $g^{b+p}$ is the second public Diffie-Hellman key; and p is the second unique identifier.

Example 26 includes the subject matter of any of Examples 24 and 25, and further including retrieving a known identifier for the second computing device over an out-of-band communication channel, wherein the known identifier is the second unique identifier.

Example 27 includes the subject matter of any of Examples 24-26, and wherein generating the shared Diffie-Hellman key comprises generating the shared Diffie-Hellman key according to $g^{ab} = (g^b)^a$, wherein a is the private Diffie-Hellman key of the first computing device.

Example 28 includes the subject matter of any of Examples 24-27, and further including generating, by the first computing device, a first keyed hash based on the shared Diffie-Hellman key, a first direct anonymous attestation group identifier of the first computing device, and the first public Diffie-Hellman key; and transmitting, by the first computing device, the first public Diffie-Hellman key, the first direct anonymous attestation group identifier, and the first keyed hash to the second computing device.

Example 29 includes the subject matter of any of Examples 24-28, and wherein the first direct anonymous attestation group identifier comprises an Enhanced Privacy Identification (EPID) group name.

Example 30 includes the subject matter of any of Examples 24-29, and further including receiving, by the first computing device, a second direct anonymous attestation group identifier and a second keyed hash from the second computing device; and verifying, by the first computing device, the second direct anonymous attestation group identifier and the second keyed hash.

Example 31 includes the subject matter of any of Examples 24-30, and wherein the second direct anonymous attestation group identifier comprises an Enhanced Privacy Identification (EPID) group name.

Example 32 includes the subject matter of any of Examples 24-31, and wherein verifying the second direct anonymous attestation group identifier comprises verifying that the second direct anonymous attestation group identifier identifies a direct anonymous attestation group having a known public key.

Example 33 includes the subject matter of any of Examples 24-32, and further including generating, by the first computing device, a first signature of the first public Diffie-Hellman key and the second public Diffie-Hellman key based on a private direct anonymous attestation key of the first computing device; and transmitting, by the first computing device, the first signature to the second computing device.

Example 34 includes the subject matter of any of Examples 24-33, and wherein generating the first signature comprises generating a first signature of the first public Diffie-Hellman key, the second public Diffie-Hellman key, and a first attestation digest of the first computing device based on the private direct anonymous attestation key of the first computing device.

Example 35 includes the subject matter of any of Examples 24-34, and further including receiving, by the first computing device and from the second computing device, a second signature of the second computing device; and verifying, by the first computing device, the second signature based on a public key corresponding with the second direct anonymous attestation group identifier.

Example 36 includes the subject matter of any of Examples 24-35, and wherein the public key comprises a public Enhanced Privacy Identification (EPID) key that corresponds with an EPID group of the second computing device.

Example 37 includes the subject matter of any of Examples 24-36, and wherein receiving the second signature comprises receiving a second signature of the first public Diffie-Hellman key, the second Diffie-Hellman key, and a second attestation digest of the second computing device.

Example 38 includes the subject matter of any of Examples 24-37, and wherein verifying the second signature comprises verifying that the second attestation digest corresponds with an attestation digest expected of a computing device having the second direct anonymous attestation group identifier.

Example 39 includes the subject matter of any of Examples 24-38, and further including generating, by the first computing device, a session key based on the shared Diffie-Hellman key; and generating, by the first computing device, a session identifier based on the first public Diffie-Hellman key, the second public Diffie-Hellman key, the first direct anonymous attestation group identifier, and the second direct anonymous attestation group identifier.

Example 40 includes the subject matter of any of Examples 24-39, and further including broadcasting, by the first computing device, an existence of the first computing device to nearby computing devices; discovering, by the first computing device, the second computing device; and opening, by the first computing device, a communication connection to the second computing device, wherein generating the first public Diffie-Hellman key comprises generating the first public Diffie-Hellman key in response to opening the communication connection.

Example 41 includes the subject matter of any of Examples 24-40, and wherein transmitting the first public Diffie-Hellman key comprises transmitting the first public Diffie-Hellman key to the second computing device over an out-of-band communication channel.

Example 42 includes the subject matter of any of Examples 24-41, and wherein transmitting the first public Diffie-Hellman key comprises transmitting the first public Diffie-Hellman key using a vibration haptic actuator of the first computing device, wherein the transmission of the first public Diffie-Hellman key is to be received by an accelerometer of the second computing device.

Example 43 includes the subject matter of any of Examples 24-42, and wherein transmitting the first public Diffie-Hellman key comprises transmitting the first public Diffie-Hellman key using a low volume ultrasonic speaker of the first computing device, wherein the transmission of the first public Diffie-Hellman key is to be received by a speaker of the second computing device.

Example 44 includes the subject matter of any of Examples 24-43, and wherein transmitting the first public Diffie-Hellman key comprises transmitting the first public Diffie-Hellman key based on a secure printed medium including a Quick Response (QR) code indicative of the first unique identifier.

Example 45 includes the subject matter of any of Examples 24-44, and wherein transmitting the first public Diffie-Hellman key comprises transmitting the first public Diffie-Hellman key over a body area network and using a touch capacitance interface of the first computing device.

Example 46 includes the subject matter of any of Examples 24-45, and wherein transmitting the first public Diffie-Hellman key comprises transmitting the first public Diffie-Hellman key over a near field communication channel established between the first computing device and the second computing device.

Example 47 includes a computing device comprising a processor; and a memory having stored therein a plurality of instructions that when executed by the processor cause the computing device to perform the method of any of Examples 24-46.

Example 48 includes one or more machine-readable storage media comprising a plurality of instructions stored thereon that, in response to execution by a computing device, cause the computing device to perform the method of any of Examples 24-46.

Example 49 includes a first computing device for trusted device on-boarding, the first computing device comprising means for generating a first public Diffie-Hellman key based on a private Diffie-Hellman key and a first unique identifier of the first computing device, wherein the first unique identifier is retrieved from secure memory of the first computing device; means for transmitting the first public Diffie-Hellman key to a second computing device; means for receiving, from the second computing device, a second public Diffie-Hellman key of the second computing device, wherein the second public Diffie-Hellman key incorporates a second unique identifier of the second computing device; means for removing a contribution of the second unique identifier from the second public Diffie-Hellman key to generate a modified public Diffie-Hellman key; and means for generating a shared Diffie-Hellman key based on the modified public Diffie-Hellman key and the private Diffie-Hellman key of the first computing device.

Example 50 includes the subject matter of Example 49, and wherein the means for the contribution of the second unique identifier comprises means for generating the modified public Diffie-Hellman key according to $g^b = g^{b+p}/g^p$, wherein $g^b$ is the modified public Diffie-Hellman key; $g^{b+p}$ is the second public Diffie-Hellman key; and p is the second unique identifier.

Example 51 includes the subject matter of any of Examples 49 and 50, and further including means for retrieving a known identifier for the second computing device over an out-of-band communication channel, wherein the known identifier is the second unique identifier.

Example 52 includes the subject matter of any of Examples 49-51, and wherein the means for generating the shared Diffie-Hellman key comprises means for generating the shared Diffie-Hellman key according to $g^{ab} = (g^b)^a$, wherein a is the private Diffie-Hellman key of the first computing device.

Example 53 includes the subject matter of any of Examples 49-52, and further including means for generating a first keyed hash based on the shared Diffie-Hellman key, a first direct anonymous attestation group identifier of the first computing device, and the first public Diffie-Hellman key; and means for transmitting the first public Diffie-Hellman key, the first direct anonymous attestation group identifier, and the first keyed hash to the second computing device.

Example 54 includes the subject matter of any of Examples 49-53, and wherein the first direct anonymous attestation group identifier comprises an Enhanced Privacy Identification (EPID) group name.

Example 55 includes the subject matter of any of Examples 49-54, and further including means for receiving a second direct anonymous attestation group identifier and a second keyed hash from the second computing device; and means for verifying the second direct anonymous attestation group identifier and the second keyed hash.

Example 56 includes the subject matter of any of Examples 49-55, and wherein the second direct anonymous attestation group identifier comprises an Enhanced Privacy Identification (EPID) group name.

Example 57 includes the subject matter of any of Examples 49-56, and wherein the means for verifying the second direct anonymous attestation group identifier comprises means for verifying that the second direct anonymous attestation group identifier identifies a direct anonymous attestation group having a known public key.

Example 58 includes the subject matter of any of Examples 49-57, and further including means for generating a first signature of the first public Diffie-Hellman key and the second public Diffie-Hellman key based on a private direct anonymous attestation key of the first computing device; and means for transmitting the first signature to the second computing device.

Example 59 includes the subject matter of any of Examples 49-58, and, wherein the means for generating the first signature comprises means for generating a first signature of the first public Diffie-Hellman key, the second public Diffie-Hellman key, and a first attestation digest of the first computing device based on the private direct anonymous attestation key of the first computing device.

Example 60 includes the subject matter of any of Examples 49-59, and further including means for receiving, from the second computing device, a second signature of the second computing device; and means for verifying the second signature based on a public key corresponding with the second direct anonymous attestation group identifier.

Example 61 includes the subject matter of any of Examples 49-60, and wherein the public key comprises a public Enhanced Privacy Identification (EPID) key that corresponds with an EPID group of the second computing device.

Example 62 includes the subject matter of any of Examples 49-61, and wherein the means for receiving the second signature comprises means for receiving a second signature of the first public Diffie-Hellman key, the second Diffie-Hellman key, and a second attestation digest of the second computing device.

Example 63 includes the subject matter of any of Examples 49-62, and wherein the means for verifying the second signature comprises means for verifying that the second attestation digest corresponds with an attestation digest expected of a computing device having the second direct anonymous attestation group identifier.

Example 64 includes the subject matter of any of Examples 49-63, and further including means for generating a session key based on the shared Diffie-Hellman key; and means for generating a session identifier based on the first public Diffie-Hellman key, the second public Diffie-Hellman key, the first direct anonymous attestation group identifier, and the second direct anonymous attestation group identifier.

Example 65 includes the subject matter of any of Examples 49-64, and further including means for broadcasting an existence of the first computing device to nearby computing devices; means for discovering the second computing device; and means for opening a communication connection to the second computing device, wherein the means for generating the first public Diffie-Hellman key comprises means for generating the first public Diffie-Hellman key in response to opening the communication connection.

Example 66 includes the subject matter of any of Examples 49-65, and wherein the means for transmitting the first public Diffie-Hellman key comprises means for transmitting the first public Diffie-Hellman key to the second computing device over an out-of-band communication channel.

Example 67 includes the subject matter of any of Examples 49-66, and wherein the means for transmitting the first public Diffie-Hellman key comprises means for transmitting the first public Diffie-Hellman key using a vibration haptic actuator of the first computing device, wherein the transmission of the first public Diffie-Hellman key is to be received by an accelerometer of the second computing device.

Example 68 includes the subject matter of any of Examples 49-67, and wherein the means for transmitting the first public Diffie-Hellman key comprises means for transmitting the first public Diffie-Hellman key using a low volume ultrasonic speaker of the first computing device, wherein the transmission of the first public Diffie-Hellman key is to be received by a speaker of the second computing device.

Example 69 includes the subject matter of any of Examples 49-68, and wherein the means for transmitting the first public Diffie-Hellman key comprises means for transmitting the first public Diffie-Hellman key based on a secure printed medium including a Quick Response (QR) code indicative of the first unique identifier.

Example 70 includes the subject matter of any of Examples 49-69, and wherein the means for transmitting the first public Diffie-Hellman key comprises means for transmitting the first public Diffie-Hellman key over a body area network and using a touch capacitance interface of the first computing device.

Example 71 includes the subject matter of any of Examples 49-70, and wherein the means for transmitting the first public Diffie-Hellman key comprises means for transmitting the first public Diffie-Hellman key over a near field communication channel established between the first computing device and the second computing device.

The invention claimed is:

1. A first computing device for trusted device on-boarding, the first computing device comprising:
a processor;
a memory coupled to the processor;
a protocol execution module to (i) retrieve a first unique identifier from the memory and (ii) generate a first public Diffie-Hellman key based on a private Diffie-Hellman key and the first unique identifier of the first computing device, wherein the first unique identifier is provisioned into a secure portion of the memory; and
a communication module to (i) transmit the first public Diffie-Hellman key to a second computing device and (ii) receive, from the second computing device, a second public Diffie-Hellman key of the second computing device, wherein the second public Diffie-Hellman key incorporates a second unique identifier of the second computing device,
wherein the protocol execution module is further to (i) remove a contribution of the second unique identifier from the second public Diffie-Hellman key to generate a modified public Diffie-Hellman key (ii) generate a shared Diffie-Hellman key based on the modified public Diffie-Hellman key and the private Diffie-Hellman key of the first computing device and (iii) open a secure session with the second computing device using the shared Diffie-Hellman key, wherein to remove the contribution of the second unique identifier comprises to generate the modified public Diffie-Hellman key according to $g^b = g^{b+p}/g^p$, wherein:
$g^b$ is the modified public Diffie-Hellman key;
$g^{b+p}$ is the second public Diffie-Hellman key;
p is the second unique identifier;
g is a generator for an Abelian group;
$g^p$ is a member of the Abelian group corresponding to g, and
/ is a division operator.

2. The first computing device of claim 1, wherein the protocol execution module is further to retrieve a known identifier for the second computing device over an out-of-band communication channel; and
wherein the known identifier is the second unique identifier.

3. The first computing device of claim 1, wherein to generate the shared Diffie-Hellman key comprises to generate the shared Diffie-Hellman key according to $g^{ab}=(g^b)^a$, wherein a is the private Diffie-Hellman key of the first computing device.

4. The first computing device of claim 1, wherein the protocol execution module is further to generate a first keyed hash based on the shared Diffie-Hellman key, a first direct anonymous attestation group identifier of the first computing device, and the first public Diffie-Hellman key; and
wherein the communication module is further to transmit the first public Diffie-Hellman key, the first direct anonymous attestation group identifier, and the first keyed hash to the second computing device.

5. The first computing device of claim 4, wherein the first direct anonymous attestation group identifier comprises an Enhanced Privacy Identification (EPID) group name.

6. The first computing device of claim 4, wherein the communication module is further to receive a second direct anonymous attestation group identifier and a second keyed hash from the second computing device; and
wherein the protocol execution module is further to verify the second direct anonymous attestation group identifier and the second keyed hash.

7. The first computing device of claim 6, wherein to verify the second direct anonymous attestation group identifier comprises to verify that the second direct anonymous attestation group identifier identifies a direct anonymous attestation group having a known public key.

8. The first computing device of claim 6, wherein the protocol execution module is further to generate a first signature of the first public Diffie-Hellman key and the second public Diffie-Hellman key based on a private direct anonymous attestation key of the first computing device; and
wherein the communication module is further to transmit the first signature to the second computing device.

9. The first computing device of claim 8, wherein the first signature comprises a first signature of the first public Diffie-Hellman key, the second public Diffie-Hellman key, and a first attestation digest of the first computing device based on the private direct anonymous attestation key of the first computing device.

10. The first computing device of claim 8, wherein the communication module is further to receive, from the second computing device, a second signature of the second computing device; and
wherein the communication module is further to verify the second signature based on a public key corresponding with the second direct anonymous attestation group identifier.

11. The first computing device of claim 10, wherein the public key comprises a public Enhanced Privacy Identification (EPID) key that corresponds with an EPID group of the second computing device.

12. The first computing device of claim 10, wherein the second signature comprises a second signature of the first public Diffie-Hellman key, the second Diffie-Hellman key, and a second attestation digest of the second computing device; and
wherein to verify the second signature comprises to verify that the second attestation digest corresponds with an attestation digest expected of a computing device having the second direct anonymous attestation group identifier.

13. The first computing device of claim 6, wherein opening the secure session comprises:
generate a session key based on the shared Diffie-Hellman key; and
generate a session identifier based on the first public Diffie-Hellman key, the second public Diffie-Hellman key, the first direct anonymous attestation group identifier, and the second direct anonymous attestation group identifier.

14. The first computing device of claim 1, further comprising:
a discovery module to (i) broadcast an existence of the first computing device to nearby computing devices and (ii) discover the second computing device; and
a connection handling module to open a communication connection to the second computing device,
wherein to generate the first public Diffie-Hellman key comprises to generate the first public Diffie-Hellman key in response to opening the communication connection.

15. One or more non-transitory machine-readable storage media comprising a plurality of instructions stored thereon that, in response to execution by a first computing device, cause the first computing device to:
retrieve a first unique identifier from memory of the first computing device, wherein the first unique identifier is provisioned into a secure portion of the memory;
generate a first public Diffie-Hellman key based on a private Diffie-Hellman key and the first unique identifier of the first computing device;

transmit the first public Diffie-Hellman key to a second computing device;
receive, from the second computing device, a second public Diffie-Hellman key of the second computing device, wherein the second public Diffie-Hellman key incorporates a second unique identifier of the second computing device;
remove a contribution of the second unique identifier from the second public Diffie-Hellman key to generate a modified public Diffie-Hellman key, wherein to remove the contribution of the second unique identifier comprises to generate the modified public Diffie-Hellman key according to $g^b = g^{b+p}/g^p$, wherein:
$g^b$ is the modified public Diffie-Hellman key;
$g^{b+p}$ is the second public Diffie-Hellman key;
p is the second unique identifier;
g is a generator for an Abelian group;
$g^p$ is a member of the Abelian group corresponding to g, and
/ is a division operator;
generate a shared Diffie-Hellman key based on the modified public Diffie-Hellman key and the private Diffie-Hellman key of the first computing device; and
open a secure session with the second computing device using the shared Diffie-Hellman key.

16. The one or more non-transitory machine-readable storage media of claim 15, wherein the plurality of instructions further cause the first computing device to:
generate a first keyed hash based on the shared Diffie-Hellman key, a first direct anonymous attestation group identifier of the first computing device, and the first public Diffie-Hellman key;
transmit the first public Diffie-Hellman key, the first direct anonymous attestation group identifier, and the first keyed hash to the second computing device;
receive a second direct anonymous attestation group identifier and a second keyed hash from the second computing device; and
verify the second direct anonymous attestation group identifier and the second keyed hash.

17. The one or more non-transitory machine-readable storage media of claim 16, wherein the plurality of instructions further cause the first computing device to:
generate a first signature of the first public Diffie-Hellman key and the second public Diffie-Hellman key based on a private direct anonymous attestation key of the first computing device; and
transmit the first signature to the second computing device.

18. The one or more non-transitory machine-readable storage media of claim 17, wherein to generate the first signature comprises to generate a first signature of the first public Diffie-Hellman key, the second public Diffie-Hellman key, and a first attestation digest of the first computing device based on the private direct anonymous attestation key of the first computing device.

19. The one or more non-transitory machine-readable storage media of claim 17, wherein the plurality of instructions further cause the first computing device to:
receive, from the second computing device, a second signature of the first public Diffie-Hellman key, the second Diffie-Hellman key, and a second attestation digest of the second computing device; and
verify the second signature based on a public key corresponding with the second direct anonymous attestation group identifier by verifying that the second attestation digest corresponds with an attestation digest expected of a computing device having the second direct anonymous attestation group identifier.

20. A computer-implemented method for trusted device on-boarding, the method comprising:

retrieving a first unique identifier from memory of a first computing device, wherein the first unique identifier is provisioned into a secure portion of the memory;

generating, by the first computing device, a first public Diffie-Hellman key based on (i) a private Diffie-Hellman key and (ii) the first unique identifier of the first computing device;

transmitting, by the first computing device, the first public Diffie-Hellman key to a second computing device;

receiving, by the first computing device and from the second computing device, a second public Diffie-Hellman key of the second computing device, wherein the second public Diffie-Hellman key incorporates a second unique identifier of the second computing device;

removing, by the first computing device, a contribution of the second unique identifier from the second public Diffie-Hellman key to generate a modified public Diffie-Hellman key, wherein removing the contribution of the second unique identifier comprises generating the modified public Diffie-Hellman key according to $g^b = g^{b+p}/g^p$, wherein:

$g^b$ is the modified public Diffie-Hellman key;

$g^{b+p}$ is the second public Diffie-Hellman key;

p is the second unique identifier;

g is a generator for an Abelian group;

$g^p$ is a member of the Abelian group corresponding to g, and

/ is a division operator;

generating, by the first computing device, a shared Diffie-Hellman key based on the modified public Diffie-Hellman key and the private Diffie-Hellman key of the first computing device; and opening a secure session with the second computing device using the shared Diffie-Hellman key.

21. The method of claim 20, further comprising:

generating, by the first computing device, a first keyed hash based on the shared Diffie-Hellman key, a first direct anonymous attestation group identifier of the first computing device, and the first public Diffie-Hellman key;

transmitting, by the first computing device, the first public Diffie-Hellman key, the first direct anonymous attestation group identifier, and the first keyed hash to the second computing device;

receiving, by the first computing device, a second direct anonymous attestation group identifier and a second keyed hash from the second computing device; and verifying, by the first computing device, the second direct anonymous attestation group identifier and the second keyed hash.

22. The method of claim 21, further comprising:

generating, by the first computing device, a first signature of the first public Diffie-Hellman key and the second public Diffie-Hellman key based on a private direct anonymous attestation key of the first computing device;

transmitting, by the first computing device, the first signature to the second computing device;

receiving, by the first computing device and from the second computing device, a second signature of the first public Diffie-Hellman key, the second Diffie-Hellman key, and a second attestation digest of the second computing device; and verifying, by the first computing device, the second signature based on a public key corresponding with the second direct anonymous attestation group identifier by verifying that the second attestation digest corresponds with an attestation digest expected of a computing device having the second direct anonymous attestation group identifier.

* * * * *